June 22, 1948.  E. L. D'OUVILLE ET AL  2,443,606
PRODUCTION OF BRANCHED CHAIN PARAFFIN HYDROCARBONS
Filed Dec. 9, 1939  3 Sheets-Sheet 1

Inventors:
Edmond L. d'Ouville
Bernard L. Evering
By Clarence H. Seeley
Attorney.

Patented June 22, 1948

2,443,606

UNITED STATES PATENT OFFICE 2,443,606

PRODUCTION OF BRANCHED CHAIN PARAFFIN HYDROCARBONS

Edmond L. d'Ouville and Bernard L. Evering, Chicago, Ill., assignors to Standard Oil Company, Chicago, Ill., a corporation of Indiana Application December 9, 1939, Serial No. 308,480

25 Claims. (Cl. 260—683.5)

This invention relates to the production of branched-chain paraffin hydrocarbons from normally liquid hydrocarbons and more particularly to the conversion of normally liquid saturated hydrocarbons and mixtures thereof containing a large proportion of straight-chain paraffins into products consisting predominantly of branched-chain paraffin hydrocarbons.

In the operation of many petroleum refineries considerable quantities of straight-run naphthas are available which contain such large proportions of straight-chain paraffin hydrocarbons that they are virtually useless for blending into motor fuel, particularly aviation fuel, because of their extremely low antiknock values, which may range for example from about 40 to below zero octane number. On the other hand, branched-chain paraffin hydrocarbons are very valuable, those having from 5 to 12 carbon atoms per molecule being extremely desirable constituents of motor fuels because of their high antiknock values and freedom from gum-forming tendencies. Mixtures of these hydrocarbons which contain 5 and 6 carbon atoms per molecule are particularly suited for use as constituents of airplane fuels due to their relatively high heat content per unit weight of fuel, and mixtures of somewhat less volatile isoparaffins are excellent safety fuel constituents. Such mixtures can be readily and economically produced by means of our invention. In addition the normally liquid branched-chain paraffins as well as isobutane, which can also be one of our products, are very useful as starting materials in the manufacture of many chemical products.

By carrying out our invention according to certain modifications thereof, an important product is isobutane, and this is a key material for the preparation of hydrocarbon products which have a premium value. For example, the isobutane can be alkylated with olefins such as propylene, the butylenes, or gases containing them in the presence of suitable catalysts such as sulfuric acid to produce higher isoparaffins of excellent antiknock and stability characteristics, or it can be dehydrogenated to isobutylene over a catalyst such as chromic oxide gel or magnesium chromite and this isobutylene polymerized by known means to resins, lubricating oils or di-isobutylene. The latter compound is of course easily converted to 2,2,4-trimethyl pentane, which is generally called iso-octane, by hydrogenation, and the dehydrogenation step is a convenient source of hydrogen for the hydrogenation of the di-isobutylene, or this hydrogen can be used in carrying out the conversion of straight-chain to branched-chain paraffin hydrocarbons according to our invention.

Other investigators have proposed methods of producing isobutane and higher saturated branched-chain hydrocarbons from straight-chain paraffins using aluminum chloride as the catalyst, but these methods result in such low yields of the desired products based on the catalyst consumed that they are much too expensive for practical use. Aluminum chloride very readily forms a complex with the hydrocarbons present, and the rapid degradation of this complex to an inactive sludge has been a major factor in the low yields obtained by prior methods.

We have found that excellent yields of branched-chain saturated hydrocarbons can be obtained from normally liquid straight-chain paraffin hydrocarbons by subjecting them to the action of an aluminum halide catalyst effective in causing the conversion of straight-chain to branched-chain paraffins under a relatively high hydrogen pressure. The hydrogen greatly retards the rate of deactivation of the catalyst, thereby allowing especially high yields of the desired products per unit weight of catalyst, and reducing catalyst costs so that the process is economically attractive.

It is an object of our invention to provide a process for the production of branched-chain saturated hydrocarbons with high yields per unit of catalyst consumed from normally liquid saturated hydrocarbons such as predominantly paraffinic naphthas. Another object is to provide a process whereby naphthas of low antiknock values are converted into mixtures rich in saturated branched-chain paraffin hydrocarbons of high stability, high knock rating and of volatility suitable for use as airplane fuels. Still another object is to provide a method of preparing a product consisting substantially of isobutane from normally liquid straight-chain paraffin hydrocarbons and mixtures thereof. Other objects, advantages and uses of our invention will appear from the following detailed description read in conjunction with the drawings which form a part of this specification and in which:

Figure 1:
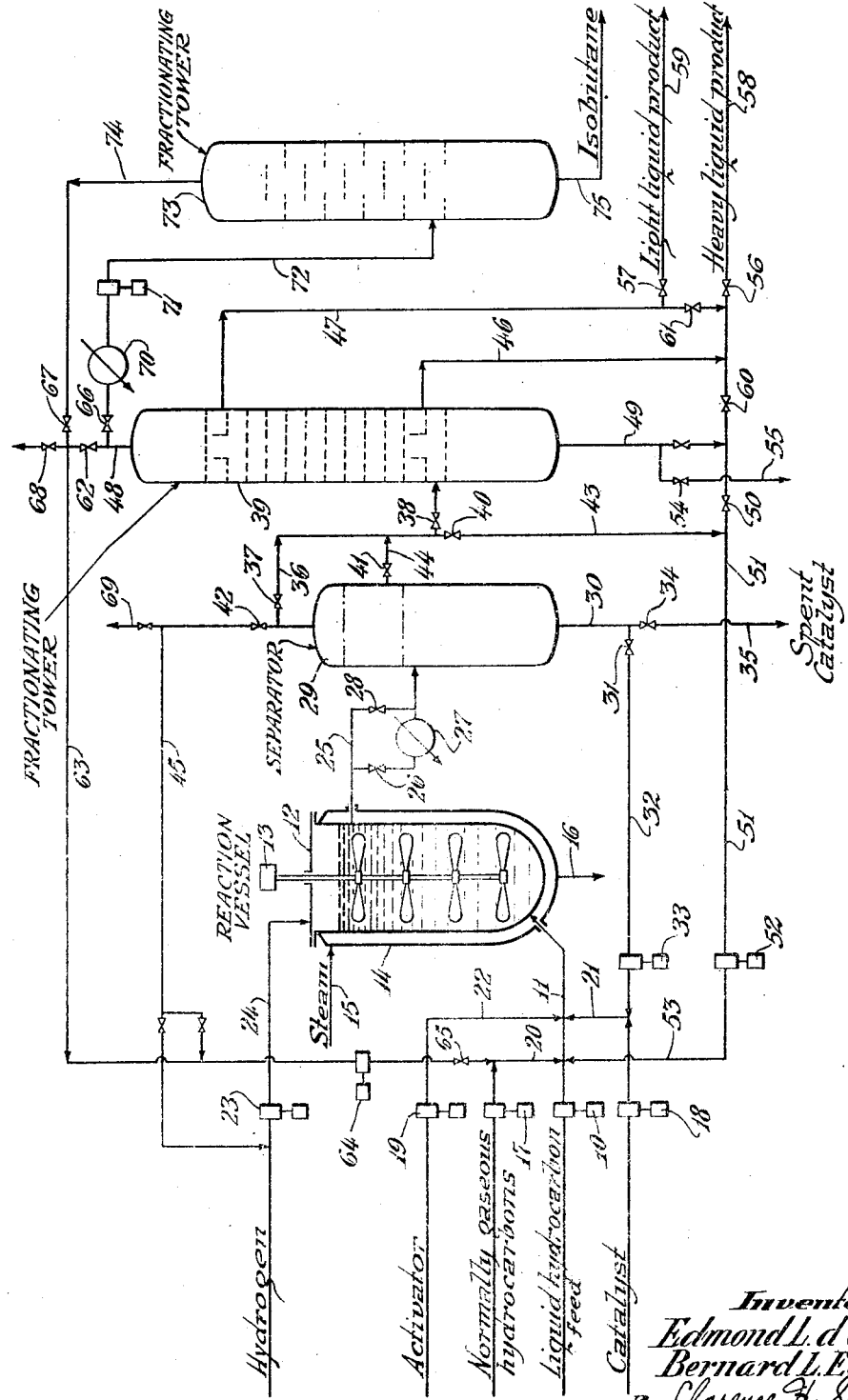
Figure 1 shows in a schematic manner an apparatus suitable for carrying out our invention.

In one of its broad aspects our invention comprises the reaction of normally liquid hydrocarbons which are essentially paraffinic in nature and at least predominantly of straight-chain configuration in the presence of an aluminum halide catalyst effective in causing the conversion of straight-chain to branched-chain paraffins at a temperature in the range from about 100° F. to about 550° F. under a hydrogen pressure in the range from about 250 to about 6000 pounds per square inch. As will be brought out below the presence of certain other materials is desirable under some conditions within these ranges.

The feed stock to our process can be any substantially saturated normally liquid hydrocarbon fraction rich in straight-chain paraffins. For example, it can be a relatively pure normally liquid straight-chain paraffin hydrocarbon such as normal heptane, but generally predominantly paraffinic straight-run naphthas such as those from Michigan, Pennsylvania, or Mid-Continent crude oil are preferred since they are much more readily available. Natural gasoline fractions are also suitable and are plentiful and inexpensive in some production areas. It is very important that the feed stock be almost free from aromatic hydrocarbons since they have been found to reduce the activity of the catalyst to a very marked degree and consequently seriously limit the amount of conversion obtained per unit weight of catalyst. Our preferred feed stock therefore contains less than 5% and preferably 0.5–1.0% or less of aromatic hydrocarbons. In many cases a preliminary solvent extraction step or other treatment is necessary or desirable to reduce the aromatic content of the feed to a value sufficiently low to minimize interference with the catalyst activity.

Our invention is not applicable to cracked naphthas because of their large content of aromatics and olefins. A relatively small amount of the latter can be tolerated in the reaction, but they are preferably substantially absent since they tend to reduce the catalyst activity, although not as markedly as do the aromatics. Naphthenic or cycloparaffinic hydrocarbons on the other hand are not injurious to catalyst life but react to form isomers, cyclohexane for example being converted to methyl cyclopentane almost quantitatively. Since the conversion of straight-chain paraffin hydrocarbons of low value into the more useful branched-chain paraffin hydrocarbons is the desired reaction and the isomerization of naphthenes does not result in appreciable increase in octane number, it is preferred to use a feed stock containing a relatively small proportion of naphthenes. The feed stock for our process therefore preferably contains at least 50% of paraffin hydrocarbons, and those containing at least 80% of paraffin hydrocarbons are especially desirable.

The liquid feed to our process can have a wide boiling range, a relatively narrow one, or, as indicated above, it can be a substantially pure normal paraffin hydrocarbon. In general the feed stock will have a boiling range within the range from about 100° F. to about 500° F., although naphthas having an initial boiling point in the neighborhood of 30° F. and including up to about 25–30% by weight of butanes can be used. A particularly suitable naphtha feed is one prepared by the distillation and fractionation of a straight-run or natural gasoline stock to produce a light naphtha having an initial boiling point in the range from about 30° F. to about 90° F. and an end point in the range from about 145° F. to about 158° F., preferably about 152° F. In this way substantially all of the aromatics and most of the naphthenes such as cyclohexane are excluded. In one embodiment of our invention, however, it is advantageous to use a feed boiling above about 235° F. and containing hydrocarbons having 8 or more carbon atoms per molecule for the reason that this facilitates the separation of unreacted feed from the more volatile liquid branched-chain paraffins obtained in the process and consequently allows recycling of the former and a greater degree of over-all conversion.

The aluminum halide catalyst used in carrying out our invention can be, for example, aluminum chloride or aluminum bromide in anhydrous form, and it is preferably introduced into the reaction zone in the form of a slurry or solution, for instance in a portion of the feed stock. Furthermore, as will be brought out below, the catalyst complex formed during the reaction retains its activity for a considerable period of time and is useful for further conversion of straight-chain paraffins, especially at relatively high temperatures. The concentration of catalyst present in the reaction zone can vary within wide limits, depending primarily upon the temperature, reaction time and catalyst activity or "freshness." Using substantially aromatic-free charging stocks under a hydrogen pressure of about 900 pounds per square inch at a reaction temperature of 330° F., an activated aluminum chloride catalyst which has been in the reaction zone for an average time of 7–8 hours, and a catalyst consumption (rate of fresh aluminum chloride addition) of 0.7 lb. of aluminum chloride per 100 lbs. of naphtha charged, by way of example, we recommend operating under such conditions that the product of the catalyst-to-oil weight ratio and the reaction time in minutes—herein called the contact factor—is about 5.0, since this has been found to give a large octane number increase with high yields. The following table illustrates good operating conditions by way of example.

|  | Example No. | | | |
| --- | --- | --- | --- | --- |
|  | 1 | 2 | 3 | 4 |
| Catalyst-to-Oil Ratio in Reactor | .10 | .20 | .40 | .60 |
| Reaction Time, Minutes | 50 | 25 | 12.5 | 8.33 |
| Contact Factor | 5.0 | 5.0 | 5.0 | 5.0 |

In the event higher or lower catalyst consumption is intentionally used, a correspondingly lower or higher contact factor respectively is recommended. In the event stocks containing aromatics are used the contact factor must be increased to get the same octane number increase, the exact amount of increase being dependent on the amount of aromatics and the yield desired. Alternatively or in addition, the fresh catalyst feed rate, or consumption may be increased thus partially or wholly offsetting an otherwise necessary increase in contact factor. Almost invariably the amount of catalyst used up or rendered inactive will be quite small, e. g. less than 5%, even when stocks containing fair amounts of aromatics are being processed, but more generally this figure will be within the range from about 0.2% to about 2.0% by weight.

At a lower reaction temperature, the contact factor must be greater to get the same conversion.

Approximately equivalent operations at various temperatures are suggested by way of example.

| | Example No. | | | | | |
|---|---|---|---|---|---|---|
| | 1 | 5 | 6 | 7 | 8 | 9 |
| Temperature, °F | 330 | 300 | 250 | 210 | 210 | 370 |
| Catalyst-to-Oil Ratio in Reactor | .10 | .10 | .20 | .10 | .60 | .10 |
| Reaction Time, Minutes | 50 | 88 | 120 | 630 | 105 | 25 |
| Contact Factor | 5.0 | 8.8 | 24.0 | 63 | 63 | 2.5 |

The contact factor may also be calculated for continuous operation by dividing the feed rate in pounds per minute into the pounds of catalyst in the reactor.

Under most conditions we prefer to employ an activator with the aluminum halide catalyst. When our preferred catalyst, aluminum chloride, is used, the presence of an activator is necessary in order that a reasonable reaction rate may be obtained, but in the case of aluminum bromide, the activator can be dispensed with under some circumstances. As activator we can use a hydrogen halide or any compound which in the presence of the catalyst affords a hydrogen halide under the reaction conditions, preferably in an amount sufficient to supply a concentration in the reaction zone of about 1 to 2 mols of hydrogen halide per mol of aluminum halide, which will usually be in the range from about 0.03% to 3.0% by weight of hydrogen halide based on the charge (although larger amounts than 3% may be employed as shown by various runs hereinafter tabulated). Our preferred promoter is hydrogen chloride, but hydrogen bromide, carbon tetrachloride, the alkyl halides such as methyl chloride or bromide, ethyl chloride or bromide, etc. can be used. In general the chlorinated and brominated hydrocarbons, particularly the more volatile ones, are suitable.

As hereinabove stated the reaction is carried out in accordance with our invention under a relatively high hydrogen pressure, which may range from about 250 to about 6000 pounds per square inch. Preferably, however, hydrogen pressures in the range from about 500 to about 1500 pounds per square inch are employed. In laboratory work more or less pure hydrogen has been used. However, in plant operation of the process, hydrogen containing impurities such as methane is available at much lower cost and can be used effectively so long as the hydrogen content of the gas is above about 50 mol per cent, in which case the hydrogen pressure previously mentioned as preferred would be the hydrogen partial pressure rather than the total gas pressure.

The presence of hydrogen under pressure is essential to economical utilization of the catalyst, and causes a substantial increase in yield and octane number of the liquid products as well as greatly increased catalyst life. These extremely advantageous results flowing from the use of hydrogen as specified herein are clearly demonstrated by comparison of runs 30 and 31, which are discussed below in considerable detail. It will suffice here to point out that under otherwise comparable conditions a given quantity of catalyst increased the octane number of a total of 10,205 parts by weight of a given stock by 13.5 points at a yield of 97.7% by volume in the presence of hydrogen, but in the absence of hydrogen was able to increase the octane number of only 4189 parts by weight by 7.4 units at a yield of 94.2%. In addition the catalyst from the former run was more active at the end (14.78 hours) than was that from the second run after 2 hours.

Another important variable which influences the course of the reaction is temperature. In general, temperatures ranging from about 100° F. to about 550° F. are suitable although different reaction times, amounts of catalyst, and even reactants are almost imperative in order that economically practicable results may be obtained at various temperatures. For example, in the range from about 100° F. to about 350° F. (herein called "low temperature operation") there is little or no tendency for the liquid charge to be broken down into normally gaseous hydrocarbons except at relatively high catalyst concentrations or long reaction times, while in the range from about 350° F. to about 550° F. this tendency is much greater. The normally gaseous hydrocarbons formed under severe reaction conditions consist principally of propane and isobutane together with a small amount of normal butane. Under exceptional circumstances a small amount of permanent gases (ethane and lighter) is obtained but this is an indication of drastic overtreatment resulting from too high a temperature, too great a catalyst concentration, too long a reaction time, or a combination of these. Because the changes in the character of the products is a gradual one, and the reaction conditions, etc. can be adjusted to form either little or a great deal of isobutane or propane plus isobutane in the intermediate temperature range, a somewhat overlapping relatively high temperature range, 300° F. to 550° F., is called herein "high temperature operation." As indicated above, the temperature limits set forth can be only approximate because of the considerable number of variables which can influence the reaction.

We have further found that the formation of propane and the butanes can be substantially completely inhibited in high temperature operation by carrying out the reaction in the presence of a substantial amount of substantially saturated gases consisting essentially of propane and either or both butanes, for instance 10 to 35% by weight of propane and 5 to 25% by weight of butanes based on the higher boiling paraffins present, and limiting the percent of the latter converted to a maximum of about 65 to 70% per pass. These light saturated hydrocarbons of course may be a constituent of the "naphtha feed." This limitation of the conversion can be controlled by regulation of the temperature and contact time in the reaction zone and the catalyst-to-oil ratio. When the production of substantial amounts of isobutane is desired, however, the saturated hydrocarbon gas supplied to the reaction can be principally propane so that formation of further quantities of propane is inhibited while isobutane is produced in substantial yields. Normal butane is readily isomerized to isobutane in passing through the reaction zone, so that it is advantageous to add it rather than isobutane whenever it is available. Methane and ethane are without effect in preventing the degradation of liquid paraffins to gases and their presence in the reaction zone is generally undesirable since they act as diluents and complicate the handling of the reaction products, but minor quantities can, of course, be present.

In some cases it may be desirable to obtain a product containing a large proportion of isobutane from the liquid feed and this can be done by reducing the quantity of butanes charged to the reaction step or, as mentioned above, eliminating their use entirely while continuing to add propane. Preferably, the reaction in this case is carried out at a higher conversion per pass, e. g. 80–85% by using more catalyst, that is, a higher catalyst-oil ratio in the reactor, longer contact time, etc. Furthermore, the yield of isobutane can be raised an additional amount by recycling the heavier converted products, but generally these products are of such value that their further treatment is economically undesirable.

From the above, it will be seen that our invention can be carried out advantageously either in the range from about 100° F. to about 350° F. in the absence of propane or in the range from about 300° F. to about 550° F. in the presence of propane. Preferably the temperature ranges used are 200° F.–350° F. and 350° F.–475° F. respectively. In the overlapping range from about 300° F. to about 350° F. and under most operating conditions, there is some tendency for the normally liquid feed to be converted into isobutane but very little or no propane formation. Under these circumstances it is often advantageous to inhibit the formation of isobutane by the introduction of normal butane and/or isobutane without any propane into the reaction zone with the liquid feed stock.

As will be understood by those skilled in the art, the time during which the liquid feed stock and the catalyst are contacted under the reaction conditions can vary over a wide range depending primarily upon the particular feed stock, temperature, catalyst concentration and desired degree of conversion. In practical operations it is of course advantageous to use relatively short times of contact in order that the capacity of a given apparatus may be as great as is feasible under the particular circumstances involved. Due to the many variables involved it is impossible to define the proper contact time for each specific situation, but we prefer to use a contact time such that the product of the weight ratio of catalyst to liquid hydrocarbons in the reaction zone and the average reaction time is greater than a specified value which is a function of temperature. This product is a rough measure of the severity of the treatment at a given temperature, and, as mentioned above, is herein called the "contact factor," represented by the symbol "K." In mathematical terms, (1) $$K = \frac{C}{O} \cdot t$$

where:
C = weight of catalyst in reaction zone,
O = weight of liquid hydrocarbons in reaction zone, and
t = average time of contact between hydrocarbon feed and catalyst.

When our process is operated continuously it is somewhat more convenient to define the contact factor in terms of liquid feed rate according to the following equation:

(2) $$K = \frac{C}{F}$$

where:
C = weight of catalyst in reaction zone, and
F = rate at which liquid hydrocarbons are charged to the reaction zone, in weight units per unit time.

The factor K has the dimensions of time, and will hereinafter be expressed in minutes.

The minimum value of the contact factor K that can be employed in carrying out the invention advantageously varies with temperature approximately as indicated by the equation.

(3) $$\log_{10} K_m = -6.417 + \frac{4883}{460 + T}$$

where:
$K_m$ is the minimum contact factor at a given temperature in minutes, and
T is that temperature in degrees Fahrenheit.

With regard to maximum values of K, the following may be said. According to Equation 3 the minimum value for K at 330° F. is about 0.5 minute. We have found from the experiments described in connection with Table IV below that exceptionally good results are obtained with relatively fresh catalyst using a light naphtha feed in the range of K values from about 1.5 to about 8 minutes (or somewhat higher) at that temperature. However, approximately equivalent improvement in the charging stock can be obtained using relatively old catalyst and correspondingly larger contact factors, which in the case of very old catalyst may even reach values of the order of a thousand times the minimum. The choice of catalyst freshness and the corresponding contact factor to be used in any particular plant depend upon such factors as investment, stirring and catalyst costs. Other feed stocks may require more drastic treatment than the light naphtha mentioned above and consequently larger values of the contact factor K. All of the above is predicated upon the assumption that good contact between catalyst and hydrocarbon material is obtained in the reaction zone, and apparatus providing such contact must be used or due allowance made therefor.

It is apparent that the process of our invention can be carried out either batch-wise or continuously, although we prefer continuous operation, and that certain portions of the apparatus must be constructed of corrosion-resistant materials to prevent rapid deterioration thereof from the active halogen compounds present. We have found that iron-compound impurities should be eliminated as far as possible from the reaction zone. For example, ferric oxide definitely lowers the amount of conversion or requires a greater contact factor to obtain the same degree of conversion, and results in greater catalyst consumption. We have also found that the use of iron and carbon steel reaction vessels greatly decreases the amount of conversion obtainable, so that it is preferred that the reaction vessels be constructed of or lined with non-ferrous materials such as glass, ceramic substances, aluminum, etc., or corrosion-resistant alloys such as stainless steel. In the case of stainless steel containing 18% chromium and 8% nickel, it was found that a somewhat greater amount of activator was necessary in order to obtain yields of products comparable with those obtained in glass apparatus, but the cost of the additional activator may be balanced against the greater durability of stainless steel equipment.

Our invention will now be described in more detail in connection with the apparatus shown in Figure 1. The normally liquid feed is introduced into the system by means of pump 10 and line 11 and thence into the lower portion of the reaction vessel 12 which is shown as a jacketed pressure vessel equipped with a stirring device 13 so that the reaction materials are thoroughly contacted. The desired reaction temperature is maintained by passing a suitable gaseous or liquid heating agent through the jacket 14 of reaction vessel 12 by means of inlet 15 and outlet 16. In high temperature operation, saturated hydrocarbon gas consisting predominantly of propane and/or at least one of the butanes, catalyst slurry and activator are introduced into line 11 and mixed with the feed therein by means of pumps 17, 18 and 19, and lines 20, 21 and 22 respectively. When low temperature operation is employed, obviously pump 17 is not used. Free hydrogen is supplied to the upper portion of reaction vessel 12 through pump 23 and line 24, and is there maintained at the desired reaction pressure, which is sufficiently high to cause the hydrogen to dissolve in the agitated reaction mixture at a rate at least as great as it is used up in the reaction. Obviously if desired a number of reaction vessels can be used in series or parallel in place of the one shown, or vessels of other types well-known in the art can be substituted therefor.

A portion of the entire reaction mixture is continuously withdrawn from the upper portion of vessel 12 through line 25 and passes either through valve 26 and cooler 27 or through bypass valve 28 or partly through each valve into separator 29. The products consist of a catalyst complex which settles out in the lower portion of separator 29, and an upper layer consisting of a mixture of hydrocarbons containing branched-chain paraffins having from 4 to 7 or more carbon atoms per molecule, unreacted feed stock, dissolved hydrogen, and unreacted paraffinic gases if such have been charged. The catalyst complex is continuously withdrawn from separator 29 through line 30 and either recycled to line 21 through valve 31, line 32 and pump 33 or withdrawn from the system through valve 34 and line 35, or under some conditions a portion of the complex may be continuously withdrawn from the system and the remainder recycled. The substantially spent complex can, of course, be regenerated or the aluminum halide recovered therefrom and reintroduced into the system through pump 18. Furthermore, at least a portion of the spent complex can be treated with water or otherwise to furnish hydrogen halide for use as activator in the process.

The upper layer is removed from separator 29 through line 36 and valve 37 and passed through valve 38 into fractionating tower 39, valves 40, 41 and 42 in lines 43, 44 and 45, respectively being closed. Valve 38 is preferably of the pressure-reducing type adjusted to the desired fractionating pressure. Fractionating tower 39 is of a conventional type provided with two sidestream outlets 46 and 47 and is operated so that the bottoms therefrom contain undesirably heavy hydrocarbons, the normally liquid hydrocarbons falling within a desired boiling range are withdrawn through outlets 46 and 47 and gases having less than 5 carbon atoms per molecule are withdrawn overhead through line 48. The heavy liquids collecting at the bottom of fractionator 39 are withdrawn through line 49 and are preferably recycled to line 11 for further treatment through valve 50, line 51, pump 52, and line 53. Under some conditions it may be desirable to withdraw a portion of these heavy liquids from the system and this can be done through valve 54 and line 55. When using a feed stock boiling above 235° F., fractionating tower 39 can be so operated that the products and unreacted feed boiling in this range are not vaporized but collect in the tower bottom and are recycled in this manner, while the lower boiling liquid products are recovered as sidestreams through lines 46 and 47. Alternatively the conditions in fractionating tower 39 can be regulated so that the liquid products boiling within the motor fuel range, e. g. about 100–400° F., are obtained as side streams while the heavier fraction is recycled.

The sidestreams consisting predominantly of branched-chain paraffin hydrocarbons withdrawn through lines 46 and 47 are sent to storage by means of valves 56 and 57 and lines 58 and 59, respectively, valves 60 and 61 being closed. By thus keeping the desired products separated into relatively light and relatively heavy fractions, their use as blending constituents for motor fuels is facilitated and stabilization if necessary can be carried out only on the light product. However, by closing valve 57 and opening valve 61 the entire product can be withdrawn in a single stream through line 58.

In high temperature operation the overhead passing through line 48 consists of excess hydrogen, propane, isobutane and possibly some normal butane, and also hydrogen halide, and this overhead is preferably recycled to line 20 through valve 62, line 63, pump 64 and valve 65 to inhibit the conversion of the feed into such gases and reduce the quantity of the various gases which must be introduced from outside the system. During this procedure, of course, valves 66 and 67 leading to a further fractionation system, are closed and valve 68 controlling a vent is at least partly closed. In the event impure hydrogen is used the system must be purged of inert gases, either intermittently or continuously, for example through valve 68 or a valved vent 69 on line 45. If it is desired, however, to recover the isobutane formed during the process, valve 62 is closed and valves 66 and 67 are opened so that the gas stream passes through cooler 70, pump 71 and line 72 into fractionating tower 73 which is operated under such conditions that the liquid bottoms contain the hydrocarbons having 4 carbon atoms per molecule and the overhead which is withdrawn through line 74 and valve 67 for recycling as described consists essentially of propane and hydrogen and also hydrogen halide. The $C_4$ fraction is withdrawn from the bottom of tower 73 through line 75 and consists predominantly of isobutane, a large proportion of the normal butane charged through pump 17 being converted to isobutane in the process and the remainder being formed from the liquid feed.

Obviously the overhead passing through line 48 during low temperature operation will contain substantially no propane, and may contain very little isobutane. However, isobutane will be present in considerable quantities if the reaction conditions other than temperature are relatively severe, or if normal butane or isobutane is charged to reaction vessel 12, and it can be separated from the hydrogen and other light gases in fractionating tower 73 as described above.

A variant of the above-described procedure which is often advantageous is carried out by reducing the pressure in separator 29 by manipulation of valves 26 and 28, thus causing a gaseous phase to form therein consisting primarily of hydrogen, hydrogen halide and normally gaseous paraffins. This mixture of gases can be recycled through valve 42 and line 45 to line 63 and pump 64, and/or to the inlet of pump 23, while the upper liquid layer is passed to fractionating tower 39 by means of valve 41 and line 44. One advantage of this arrangement is that the volume of gases in tower 39 and compression costs are reduced, and better fractionation is obtained.

In another type of operation which is advantageous if it is desired to obtain a product having on the average a larger number of side chains and therefore a higher antiknock value, valve 40 is opened during the early stages of a run so that most of the reaction products are recycled through lines 43 and 51, pump 52 and line 43. The branched-chain paraffins upon passing again through the system tend to become more branched in configuration and consequently have a still higher antiknock value. More and more of the products flowing through line 36 are then allowed to pass through valve 38 to the fractionating tower 39 in which these branched-chain hydrocarbons are recovered as described above, a certain percentage of the total products, however, continuing to return through valve 40 to the reaction chamber 12.

Another method of accomplishing substantially the same result consists in opening valves 60 and 50 rather than valve 40 and recycling the relatively heavy sidestream product withdrawn from fractionating tower 39 through line 46 and it may even be desirable in the early stages to recycle the products withdrawn from tower 39 through line 47 by opening valve 61. As in the previous method, however, flow through valve 60 is gradually restricted so that only a part of the products is recycled.

Still another method of operation which is applicable when isobutane is desired as a principal product is to close valve 56 entirely and recycle the entire heavy liquid product to be broken down into isobutane, which action can be facilitated by using relatively large amounts of catalyst and introducing little or no butane or isobutane into the system through pump 17 and line 20. By closing valve 57 and opening valve 61 the light liquid product can be similarly recycled. In this method of operation valve 62 is, of course, kept closed and valves 66 and 67 leading to the isobutane recovery system are open.

Figure 2:
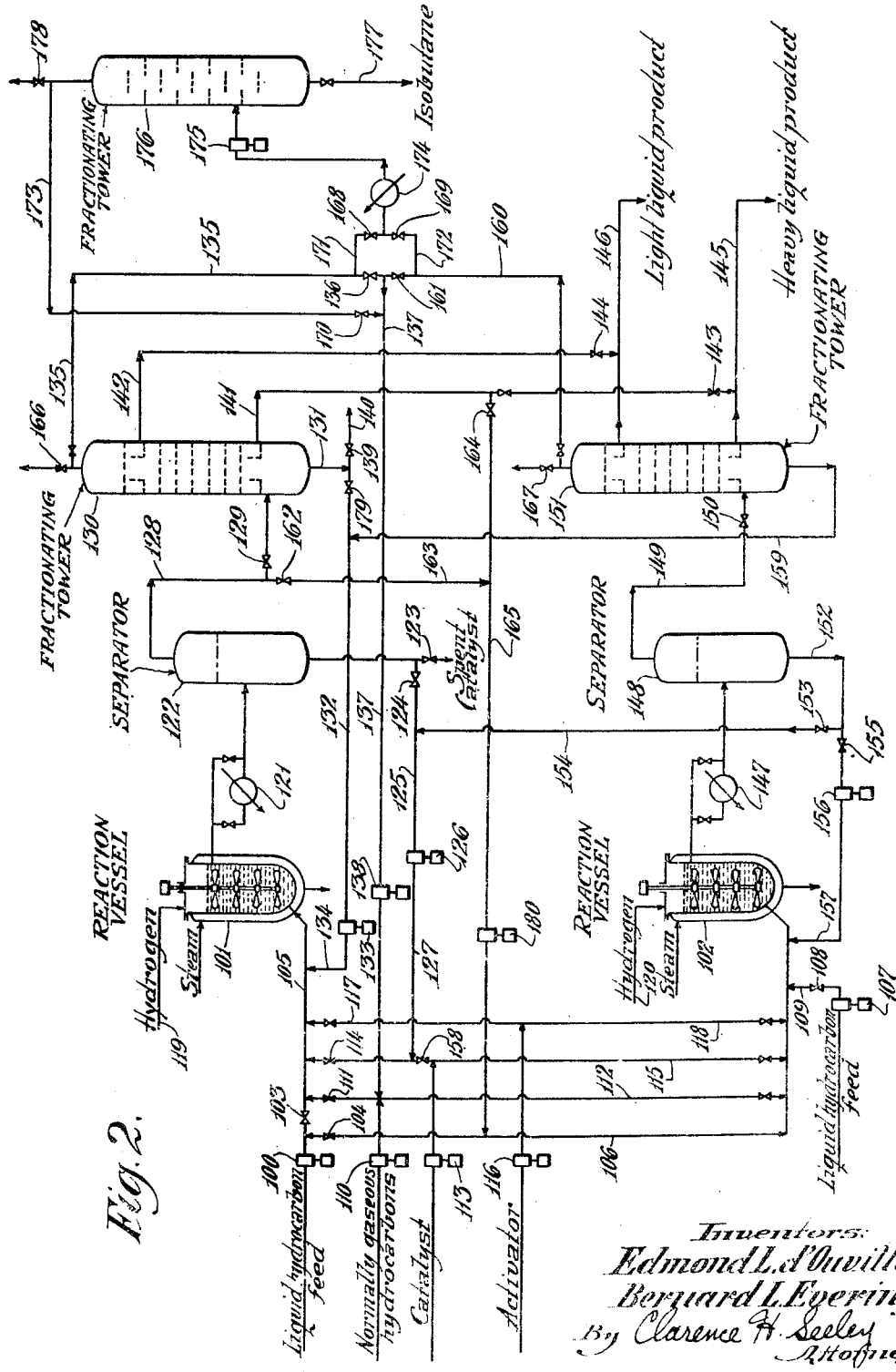
Figure 2 shows schematically a form of apparatus for carrying out our invention in a two-stage modification which is advantageous under some conditions.

Figure 2 illustrates a particularly advantageous embodiment of our invention in which the conversion of straight-chain to branched-chain paraffins is carried out in two steps, the reaction in one step being carried out under conditions of high temperature operation while in the other a lower temperature in the range of low temperature operation is maintained. In this way the catalyst complex formed in the low temperature stage which has lost its activity under the conditions in that stage can be used at the higher temperature to convert further quantities of straight-chain hydrocarbons in accordance with the invention.

Referring now to Figure 2, the liquid feed is supplied by pump 100 to reaction vessels 101 and 102 simultaneously through valves 103 and 104 and lines 105 and 106 respectively, or, if desired a different liquid feed can be charged to reaction vessel 102 through pump 107, valve 108 and line 109, valve 104 being closed. Light paraffinic gas is supplied to reaction vessel 101 by means of pump 110 and line 111, while catalyst slurry and activator are supplied to reaction vessels 101 and 102 by means of pump 113 and lines 114 and 115, and pump 116 and lines 117 and 118, respectively. Hydrogen in excess is supplied under the desired reaction pressure directly to reaction vessels 101 and 102 through inlets 119 and 120 respectively, these vessels being of the same type as vessel 12 in Figure 1.

The reaction in reaction chamber 101 is carried out as described above for high temperature operation and the products are passed through cooler 121 to separator 122 from which the separated catalyst complex is withdrawn and either removed from the system through valve 123 or recycled through valve 124, line 125, pump 126 and line 127 into lines 114 and 105 and reaction vessel 101. The hydrocarbons and hydrogen are withdrawn from the top of separator 122 through line 128 and pass through valve 129 into fractionating tower 130 in which separation into desired products, heavy hydrocarbon materials and gases is carried out. The undersirable or unreacted heavy materials are withdrawn from the tower bottom through line 131 and recycled to line 105 by means of line 132, pump 133 and line 134, while the gaseous overhead is recycled to line 110 through line 135, valve 136, line 137 and pump 138. Optionally, of course, any portion of the heavy materials can be eliminated through valve 139 and line 140. Finally, the products are withdrawn as sidestream through lines 141 and 142, valves 143 and 144, and lines 145 and 146.

Reaction vessel 102 is maintained at a lower temperature than that in reaction vessel 101 in the range from about 100° F. to about 350° F. and under these conditions the formation of gaseous hydrocarbons from the liquid feed is absent or at least much less pronounced as explained above but the activity of the catalyst is not as completely exhausted as in reaction vessel 101. The total products from reaction vessel 102 pass through cooler 147, are separated from the catalyst complex in separator 148 and pass through line 149 and valve 150 to fractionating tower 151, the complex from separator 148 being passed through line 152, valve 153 and line 154 into line 125 for use in reaction vessel 101. Optionally a portion of the catalyst complex in line 152 can be recycled to reaction vessel 102 through valve 155, pump 156 and line 157, but when its activity has reached a point at which it is relatively inactive at 100–350° F. it is advantageous to restrict the amount recycled within the same stage through valve 155. As the run proceeds the flow of fresh catalyst through line 114 to reaction vessel 101 can be gradually restricted and in some cases can be completely stopped by manipulation of valve 158, so that the activity of the catalyst is exhausted at the high temperature used in the first stage, while a part of the total feed is processed in each stage.

The desired branched-chain paraffin products are removed as sidestreams from fractionating tower 151 and passed through lines 145 and 146 in which they are mixed with the light and heavy products from the first stage. The heavy liquids collecting in the bottom of tower 151, which may be for example largely unreacted feed when the feed stock is chosen so that it boils above 235 F., is introduced into line 132 for introduction into the first stage by means of line 159. Similarly, the hydrogen together with gases containing less than 5 carbon atoms per molecule, if such gases are present, pass through line 160 and valve 161 into line 137 for recirculation.

In this method of operation valve 162 in line 163 and valve 164 in line 165 are kept closed. Vent valves 166 and 167 are also normally closed, but may be partially opened from time to time to allow some of the gases passing overhead from fractionating towers 130 and 151 respectively to escape from the system in order to prevent the concentration of permanent gases such as methane and ethane from building up.

Valves 168, 169, and 170 in lines 171, 172 and 173 leading to a gas fractionating system are also closed unless it is desired to obtain a fraction containing largely isobutane as one of the products. If this fraction is desired, valves 168, 169 and 170 are opened and valves 136 and 161 closed, so that the gases from both fractionating towers 130 and 151 are combined and passed through cooler 174 and pump 175 to fractionating tower 176, in which the hydrocarbons containing four carbon atoms per molecule are separated from the lighter gases as a liquid fraction, which consists largely of isobutane and is withdrawn from the system through line 177. The overhead, which consists largely of propane and hydrogen, is then recycled through line 173, valve 170, line 137, and pump 138, or a portion may be vented through valve 178 to prevent accumulation of undesirable permanent gases in the system. Optionally overhead from either tower 130 or tower 151 may be sent to tower 176 for isobutane recovery while overhead from the other is recycled directly.

In another modification of our invention we use the second stage operating at relatively low temperatures for the purpose of increasing the average number of side chains per molecule in the product and this can be accomplished by closing valves 104, 129, 136, 143, 144, 164, and 179, and passing the entire hydrocarbon mixture together with hydrogen from separator 122 through line 128, valve 162, lines 163 and 165, and pump 180, and to line 106 for introduction into reaction vessel 102. In this way the already branched-chain paraffins formed in reaction vessel 101 are subjected to further treatment to increase the degree of branching but under such mild conditions that degradation to gaseous hydrocarbons is minimized.

In still another method of accomplishing this result, valve 162 is closed and valves 129, 136, 144, 164 and 179 are opened so that fractionating tower 130 is again operated and the heavier branched-chain products in line 141 are passed through valve 164, line 165, and pump 180 into line 106 for introduction into the second stage of the process. The last two methods, of course, include the use of the catalyst complex from the separator 148 of the low temperature stage as all or a part of the catalyst required for the higher temperature conversion in reaction vessel 101, and other features mentioned in connection with the detailed description of Figure 2.

We have also found that catalyst complex formed during the reaction upon a substantially aromatic-free stock gives excellent yields of branched-chain hydrocarbons from stocks containing aromatic hydrocarbons in amounts up to 5-10%. In this embodiment of our invention, a substantially aromatic-free stock, such as the light virgin naphtha of about 152° F. end point referred to above, is charged to reaction vessel 102 shown in Figure 2 by means of pump 107, valve 108 and line 109, in which low temperature operation is carried out, while a stock containing 5-10% of aromatic hydrocarbons is fed to reaction vessel 101 in the high temperature stage through pump 100, valve 103 and line 105. By closing valve 158 and opening valve 153, complex flows from line 152 through lines 154 and 125, pump 126, and lines 127, 114, and 105, and acts as catalyst in the reaction at the relatively high temperature prevailing in reaction vessel 101 to give unusually good conversion per unit of catalyst for a stock of this type. One feed stock containing some aromatics which can be used according to this phase of our invention is the relatively heavy naphtha remaining after the separation of 152° F. end point light naphtha therefrom by fractionation.

The hydrocarbon feed stock should preferably be dry and free from alkaline and ammoniacal substances. This may be accomplished by a dilute acid wash and subsequent passage through a drier.

It is apparent that we have described a method of producing branched-chain paraffin hydrocarbons from straight-chain paraffin hydrocarbons with excellent yields and using a minimum of catalyst. In the following table, Table I, the results are given of two batch runs which were made at a temperature in the range of high temperature operation in glass-lined apparatus using pure normal heptane in the presence of an excess of hydrogen and of two runs made in an iron apparatus at substantially the same temperature. It will be understood that the catalyst requirements are substantially lower on a continuous basis. Run 1 illustrates the results obtainable according to a preferred form of our invention while run 2 shows that in the absence of propane and the butanes, large amounts of propane and isobutane are produced from the normal heptane rather than the more valuable branched-chain paraffins having five or more carbon atoms per molecule.

*Table I*

| Run | 1 | 2 | 3 | 4 |
|---|---|---|---|---|
| Charge: | | | | |
| N-heptane, g | 68.4 | 68.4 | 171.0 | 204.0 |
| Propane, g | 18.1 | None | None | None. |
| Isobutane, g | 15.5 | ___do___ | ___do___ | Do. |
| AlCl₃, g | 0.63 | 1.0 | 28.1 | 8.0 |
| HCl, g | 17.0 | 10.0 | Excess | 34.0 |
| H₂, initial pressure, lbs./sq. in | 1,650 | 1,900 | None | 1,800 |
| Apparatus | Glass-lined | Glass-lined | Iron | Iron |
| Conditions: | | | | |
| Temperature, °F | 400 | 400 | 392 | 400 |
| Average reaction pressure, lbs./sq. in | 3,300 | 2,850 | 1,400 | 3,000 |
| Reaction time, hours | 8.25 | 8.0 | 4.5 | 5.0 |
| Catalyst, percent by wt | 0.92 | 1.46 | 16.4 | 3.92 |
| Contact factor, min | 4.56 | 7.02 | 45.9 | 11.7 |
| Percent of N-heptane converted | 38.8 | 73 | 79 | 70 |
| Mols converted per mol AlCl₃ | 56 | 66 | 64 | 24 |
| Analysis of converted products: | | | | |
| Propane and lighter, percent by wt | None | 29.0 | 16.8 | 11.8 |
| C₄ fraction, percent by wt | 3.1 | 30.6 | 39.4 | 20.0 |
| C₅ fraction, percent by wt | 8.9 | 11.8 | 16.8 | 16.0 |
| C₆ fraction, percent by wt | 17.3 | 4.3 | 7.8 | 14.0 |
| C₇ fraction, percent by wt | 70.7 | 21.2 | 4.5 | 27.5 |
| Bottoms, percent by wt | None | None | 2.3 | 4.6 |
| Lost to catalyst complex, percent by wt | ___do___ | 2.9 | 11.8 | 5.6 |

Runs 1 and 2 are not strictly comparable inasmuch as the total percentages converted differ considerably, and the conversion was slightly high in run 2 for the economical production of normally liquid branched-chain paraffins. Nevertheless the suppression of the degradation of liquid to gaseous hydrocarbons by the added propane and isobutane in high temperature operation is clearly shown. Run 2 also illustrates the formation of isobutane from normal heptane, although in this instance the formation of propane was not inhibited, since the $C_4$ fraction was substantially pure isobutane.

Runs 3 and 4 illustrate the effect of hydrogen on the course of the reaction. It will be noted that in the presence of hydrogen under pressure, a relatively small catalyst concentration and low contact factor are required to give the same conversion of the normal heptane, and that number of mols of charge converted per mol of catalyst is much greater than in the absence of hydrogen. Another effect which is important is the difference in distribution of the products. In run 3 more gaseous products and less liquid products were obtained than in run 4 even though the degree of conversion was about the same in these runs. The data also show that the hydrogen reduces the amount of hydrocarbon material lost by the formation of catalyst complex.

As explained above iron is detrimental to the reaction and this is clearly shown by a comparison of runs 2 and 4. In each case the temperature, pressure and percent of N-heptane converted were about the same, but in the presence of iron more than twice as much catalyst was required to produce this conversion, than in its absence. Since the formation of normally gaseous products was not inhibited in runs 2, 3 and 4, none of them illustrates a preferred form of our invention at such high temperatures.

Table II gives data showing the application of our invention in the range of high temperature operation to a solvent extracted straight-run naphtha fraction. This raffinate had an A. P. I. gravity at 59.4°, initial boiling point of 214° F., 50% point of 250° F., end point of 311° F. and octane number of 38.5 (motor method), and was substantially free from aromatic hydrocarbons. Runs 5 through 10 were all made batchwise in stainless steel apparatus.

Table II

| Run | 5 | 6 | 7 | 8 | 9 | 10 |
|---|---|---|---|---|---|---|
| Charge: | | | | | | |
| Raffinate, g | 368.6 | 368.6 | 443.0 | 367.7 | 233.1 | 296.1 |
| Propane, g | None | None | None | None | 72.3 | 131.4 |
| Isobutane, g | do | do | do | do | 76.3 | 73.1 |
| AlCl$_3$, g | 11.8 | 29.8 | 11.0 | 27.0 | 10.3 | 29.5 |
| HCl, g | 11.0 | 13.0 | 10.0 | 13.0 | 10.0 | 20.0 |
| H$_2$, initial pressure, lbs./sq. in | None | None | 1,600 | 1,500 | 1,700 | 1,600 |
| Conditions: | | | | | | |
| Temperature, °F | 415 | 405 | 415 | 400 | 400 | 380 |
| Average reaction pressure, lbs./sq. in | 400 | 700 | 2,300 | 1,900 | 3,600 | 5,500 |
| Reaction time, hrs | 6.0 | 7.0 | 6.5 | 6.5 | 5.25 | 7.0 |
| Catalyst, per cent by wt. of raffinate | 3.2 | 8.1 | 2.5 | 7.3 | 3.6 | 10.0 |
| Contact factor, min | 11.5 | 34.0 | 9.7 | 28.6 | 11.3 | 41.8 |
| Products: | | | | | | |
| Propane formed, g | 5.6 | 19.2 | 24.1 | 76.3 | 30.7 | 30.0 |
| Isobutane formed, g | 21.4 | 93.2 | 24.9 | 88.1 | 51.3 | 58.0 |
| Pentanes, g | 8.9 | 46.2 | 29.0 | 54.4 | 37.2 | 53.4 |
| Yield (10 Reid V. P.), per cent by vol | 94.7 | 58.4 | 91.5 | 46.3 | 77.0 | 59.5 |
| Octane No., CFR-M | 54.1 | 63.5 | 58.0 | 73.0 | 65.0 | 72.4 |
| Increase in Octane No | 15.6 | 25.0 | 19.5 | 34.5 | 26.5 | 33.9 |

The data shown above clearly demonstrate the effect of hydrogen and of hydrogen plus propane and isobutane on the yield-octane number relationship of the product having a Reid vapor pressure of 10 pounds per square inch at 100° F. Run 5 was made in the absence of hydrogen or paraffinic gases and illustrates the fact that some improvement in octane number of a stock of low original antiknock rating can be obtained rather easily, but the product is still too low in octane number to be valuable as a motor fuel. In run 6 more catalyst and slightly more reaction time were employed in order to obtain greater conversion, but the yield dropped more than 35% while the octane number was raised less than 10 additional units. Run 7 made in the presence of hydrogen, is roughly comparable to run 5 and gave about 3% less of a product having a knock rating about 4 units greater than the product of the latter run. Run 8, however, demonstrates that really good motor fuel (octane number 73) can be produced from this stock in the presence of hydrogen, although the yield is low due to excessive decomposition to gaseous hydrocarbons. Nevertheless it should be noted that these results were obtained using less catalyst, shorter reaction time and a slightly lower temperature than in run 6, which shows that the activity of the catalyst is greatly enhanced by the hydrogen. Runs 9 and 10 were made in the presence of hydrogen plus propane and isobutane as we prefer to do under these conditions of high temperature operation. In run 9, for example, using less than half as much catalyst for a shorter period of time than was used in run 6, 77% of a product having 65.0 octane number was obtained as compared with only 58.4% of a product having a slightly lower octane number. Also, comparison of runs 10 and 8 reveals that while the octane number of the products from both are substantially the same, 59.5% was obtained using hydrogen and paraffinic gases while only 46.3% was obtained with hydrogen alone. In another comparison, the yields of product were about the same in runs 6 and 10, but the octane number of that from the latter was 9 units greater than the corresponding figure for the former run.

It is apparent from the above that the addition of hydrogen to the reactants is very advantageous with this type of charging stock, especially when relatively great octane number increases are desired, and that the presence of propane and isobutane together with the hydrogen gives by far the best results in high temperature operation. However, the most important advantage of using hydrogen pressure, namely, long catalyst life, cannot be shown by batch experiments of this type, but will be hereinafter demonstrated from runs 30 and 31 and Figure 3.

Table III gives the data on runs 11, 12, 13 and

Table III

| Run | 11 | 12 | 13 | 14 |
|---|---|---|---|---|
| Charge: | | | | |
| Light naphtha, g | 266.0 | 273.0 | 136.0 | 143.5 |
| Propane, g | 70.0 | 86.0 | 63.7 | None |
| Isobutane, g | 94.0 | 114.0 | 53.2 | Do |
| AlCl$_3$, g | 12.0 | 12.9 | 6.3 | 5.6 |
| HCl, g | 10.0 | 22.0 | 10.0 | 1.4 |
| H$_2$, initial pressure, lb./sq. in | 1,450 | 1,300 | 560 | 400 |
| Conditions: | | | | |
| Temperature, °F | 350 | 290 | 320 | 220 |
| Average reaction pressure, lb./sq. in | 3,400 | 4,000 | 1,250 | 600 |
| Reaction time, hrs | 6.0 | 6.0 | 6.0 | 6.0 |
| Catalyst, percent of naphtha by wt | 4.5 | 4.7 | 4.6 | 3.8 |
| Contact factor | 16.5 | 17.0 | 16.7 | 13.7 |
| Products: | | | | |
| Propane formed, g | None | None | None | None |
| Isobutane formed, g | do | do | 1.3 | 3.3 |
| Pentanes, g | 119.1 | | | |
| Yield C$_4$-free percent by volume | 99.8 | 99 | 97.5 | 97 |
| Octane No., CFR-M | 77.0 | 79.0 | 82.5 | 80.2 |
| Increase in Octane No | 10.0 | 12.0 | 15.5 | 13.2 |

14, which were batch runs made in stainless steel apparatus on a light virgin naphtha boiling between 95° F. and 152° F. prepared by fractionation and having an initial octane number (CFR-M) of 67.0. This naphtha was, of course, substantially free from aromatics.

catalyst, etc. in the region of low temperature operation, and the data thereon are given in Table IV.

Table IV

| Run | 15 | 16 | 17 | 18 | 19 | 20 | 21 | 22 | 23 | 24 |
|---|---|---|---|---|---|---|---|---|---|---|
| Charge: | | | | | | | | | | |
| Light Naphtha, g | 655.6 | 660 | 655.0 | 653.0 | 652.0 | 653.0 | 656.0 | 645.0 | 650.0 | 652.0 |
| AlCl₃, g | 23.1 | 22.3 | 22.8 | 23.0 | 22.5 | 22.6 | 22.7 | 22.9 | 45.7 | 70.2 |
| HCl, g | None | 3.5 | 7.0 | 10.5 | 17.2 | 6.8 | 7.2 | 7.0 | 14.0 | 20.0 |
| H₂ initial press, lbs./in.² | 580 | 575 | 600 | 600 | 600 | 600 | 600 | 600 | 600 | 620 |
| Conditions: | | | | | | | | | | |
| Temperature, °F | 332 | 330 | 335 | 335 | 335 | 333 | 330 | 330 | 330 | 330 |
| Av. reaction press, lbs./in.² | 945 | 920 | 970 | 900 | 930 | 950 | 945 | 1,000 | 930 | 920 |
| Reaction time, hrs | 3.0 | 3.0 | 3.0 | 3.0 | 3.0 | 2.0 | 3.0 | 0.5 | 0.5 | 0.5 |
| Catalyst, per cent of naphtha by wt | 3.53 | 3.38 | 3.48 | 3.52 | 3.45 | 3.46 | 3.46 | 3.55 | 7.03 | 10.75 |
| Activator, per cent of naphtha by wt | None | 0.53 | 1.07 | 1.61 | 2.64 | 1.04 | 1.25 | 1.08 | 2.16 | 3.07 |
| Activator, per cent of catalyst by wt | do | 115.7 | 30.7 | 45.7 | 76.4 | 30.1 | 31.8 | 30.5 | 30.7 | 28.5 |
| Contact factor, min | 6.37 | 6.07 | 6.25 | 6.37 | 6.18 | 4.14 | 2.58 | 1.08 | 2.10 | 3.24 |
| Results: | | | | | | | | | | |
| H₂ consumed, cu. ft | None | 0.1 | 0.05 | 0.15 | 0.26 | 0.06 | 0.04 | None | 0.33 | 0.7 |
| HCl consumed, per cent of naphtha by wt | do | 0.515 | 0.58 | 1.27 | 1.12 | 0.95 | 0.88 | 0.68 | 0.98 | 1.40 |
| Products— | | | | | | | | | | |
| Propane, per cent by wt | do | None | None | None | None | None | None | None | None | 0.5 |
| Isobutane, per cent by wt | 2.1 | 2.2 | 3.2 | 3.3 | 4.7 | 2.5 | 2.4 | 1.3 | 3.3 | 7.6 |
| Hydrocarbon in complex, per cent by wt | 1.7 | 1.3 | 1.3 | 1.7 | 0.7 | 1.0 | 0.6 | 0.9 | 1.6 | 3.1 |
| Liquid yield (C₄-free), per cent by vol | 96.5 | 96.2 | 96.4 | 95.3 | 94.4 | 96.5 | 97.1 | 97.3 | 95.9 | 89.5 |
| Octane No. (CFR-M) | 71.9 | 77.3 | 78.9 | 78.1 | 79.6 | 76.7 | 76.3 | 71.8 | 81.7 | 82.2 |
| Increase in Octane No | 4.4 | 9.8 | 11.4 | 10.6 | 12.1 | 9.2 | 8.8 | 4.3 | 14.2 | 14.7 |

| Run | 25 | 26 | 27 | 28 | 29 | 30 Tot. | 30 Av. | 31 Tot. | 31 Av. |
|---|---|---|---|---|---|---|---|---|---|
| Charge: | | | | | | | | | |
| Light Naphtha, g | 647.0 | 647.0 | 652.0 | 655.0 | 651.0 | 10,205.0 | 512 | 4,189 | 524 |
| AlCl₃, g | 23.2 | 23.0 | 45.1 | 45.4 | 44.9 | 70.3 | 70.3 | 70.4 | 70.4 |
| HCl, g | 6.2 | 7.0 | 13.7 | 14.0 | 13.8 | 284.6 | 14.2 | 117.5 | 14.4 |
| H₂ initial press, lbs./in.² | None | 1,000 | 600 | 600 | 600 | | 600 | | |
| Conditions: | | | | | | | | | |
| Temperature, °F | 330 | 330 | 296 | 207 | 213 | | 330 | | 330 |
| Ave. reaction press, lbs./in.² | 300 | 1,425 | 845 | 760 | 750 | | 925 | | 345 |
| Reaction time, hrs | 1.25 | 1.25 | 0.5 | 0.5 | 5.5 | 14.78 | 0.74 | 15.36 | 1.92 |
| Catalyst, per cent of naphtha by wt | 3.58 | 3.56 | 6.92 | 6.94 | 6.90 | 0.69 | 10.8 | 1.68 | 10.7 |
| Activator, per cent of naphtha by wt | 0.96 | 1.08 | 2.10 | 2.14 | 2.12 | 2.79 | 2.78 | 2.8 | 2.7 |
| Activator, per cent of catalyst by wt | 26.7 | 30.4 | 30.4 | 30.8 | 30.7 | 405 | 20.2 | 167 | 20.5 |
| Contact factor, min | 2.70 | 2.64 | 2.10 | 2.10 | 22.8 | | 4.80 | | 16.05 |
| Results: | | | | | | | | | |
| H₂ consumed, cu. ft | None | 0.15 | 0.17 | 0.08 | 0.03 | 6.86 | 0.34 | | |
| HCl consumed, per cent of naphtha by wt | 0.76 | 0.65 | 1.15 | 0.53 | 0.89 | 0.31 | 0.31 | 0.41 | 0.40 |
| Products— | | | | | | | | | |
| Propane, per cent by wt | None | None | None | None | None | 0.09 | Trace | None | None |
| Isobutane, per cent by wt | 1.4 | 1.8 | 3.3 | 1.0 | 0.9 | 2.14 | 2.13 | 3.7 | 3.6 |
| Hydrocarbon in complex, per cent by wt | 2.3 | 1.0 | 1.0 | 0.7 | 0.4 | 0.136 | | 2.4 | |
| Liquid yield (C₄-free), per cent by vol | 96.2 | 97.7 | 96.7 | 98.2 | 99.1 | 97.7 | 97.7 | 94.2 | 94.2 |
| Octane No. (CFR-M) | 74.0 | 76.9 | 79.4 | 75.0 | 79.2 | 81.0 | 81.0 | 74.9 | 74.9 |
| Increase in Octane No | 6.5 | 9.4 | 11.9 | 7.5 | 11.7 | 13.5 | 13.5 | 7.4 | 7.4 |

These data demonstrate the extremely good relationship between yield and octane number improvement which can be obtained by means of our invention when processing an aromatic-free light virgin naphtha. One important feature of these runs was that in each case the catalyst was still active at the end of the run, so that the actual catalyst requirement is much lower than would be assumed from the proportion of catalyst used. It will also be noted that no propane was formed in any case, and that isobutane formation was either absent or very low. Run 11 is a typical run made under preferred conditions of high temperature operation according to our invention, while run 12 shows that the addition of light paraffinic gases has no detrimental effects even when the temperature is relatively low. Runs 13 and 14 illustrate the results obtainable at hydrogen pressures within our preferred range, and the latter run shows that the presence of light paraffinic gases is not required in the temperature range of low temperature operation.

Further runs were made on another sample of light virgin naphtha boiling between 110° F. and 153° F. and having an octane number of 67.5 (CFR-M). These runs illustrate the effect of varying the reaction conditions, proportions of The first series of runs, 15 through 19, shows the effect of various proportions of our preferred activator, HCl, upon the yield-octane number relationship of the liquid butane-free product obtained from the light virgin naphtha described above. It will be noted that under the conditions used, i. e. approximately 330° F., 600 pounds per square inch initial, i. e. cold, hydrogen pressure, 3.5% AlCl₃ catalyst and 3 hours reaction time, in general the octane number increased with increasing HCl concentration, most of the octane number improvement per unit of HCl, however, being obtained at the lower concentrations.

Runs 17, 20, 21, and 22 illustrate the effect of various times of reaction. As might be expected run 17, which lasted for 3 hours, gave the largest octane number increase, and run 22 gave the smallest. However, excellent results can be obtained at 330° F. and reaction times as low as 0.5 hour, as is shown by comparison of runs 22 and 23. In the latter run twice as much catalyst and activator were used as in the former and the octane number increase of the product was 14.2 as against 4.3 with only .14% less yield. Run 24 in this series was made with three times the catalyst concentration of run 22, but gave a large octane number increase, but the low yield and large isobutane formation indicate that the severity of the treatment was too great for best results.

Runs 21, 25 and 26 show the effect of hydrogen on the reaction. It will be noted that increasing hydrogen pressure increases both yield and octane number somewhat, but the most important effect is one which cannot be demonstrated in runs of fixed reaction time, namely, the effect on catalyst life. Hydrogen, especially when under pressures ranging from 500 to 1500 pounds per square inch during the reaction, materially had been previously noticed that this was related to the extent of the octane number improvement of the naphtha feed. The pertinent data for the total run are shown in Table IV and those for the individual tests in Table V. In order to avoid loss of catalyst from the reaction bomb, only about 500 g. of the total hydrocarbon phase was removed after each test and replaced by an equivalent amount of fresh charge.

*Table V*

| Run 30 | Light Naphtha | AlCl₃ | HCl | Initial H₂ Pressure | Temperature | Pressure | Reaction Time | Contact factor |
|---|---|---|---|---|---|---|---|---|
| | Grams | Grams | Grams | Lbs./sq. in. | ° F. | Lbs./sq. in. | Hours | Minutes |
| A | 655 | 70.3 | 20.0 | 600 | 305 | 950 | 0.083 | 0.53 |
| B | 492 | | 13.9 | 600 | 310 | 900 | 0.23 | 1.96 |
| C | 492 | | 13.9 | 600 | 305 | 850 | 0.10 | 0.84 |
| D | 506 | | 13.8 | 600 | 325 | 925 | 0.28 | 2.34 |
| E | 490 | | 13.9 | 600 | 330 | 950 | 0.45 | 3.84 |
| F | 504 | | 13.9 | 600 | 328 | 950 | 0.66 | 5.59 |
| G | 504 | | 13.9 | 600 | 330 | 950 | 0.75 | 6.30 |
| H | 504 | | 13.9 | 600 | 330 | 950 | 0.87 | 7.26 |
| I | 504 | | 13.8 | 600 | 334 | 925 | 0.88 | 7.38 |
| J | 502 | | 13.8 | 600 | 332 | 925 | 0.92 | 7.74 |
| K | 500 | | 13.9 | 600 | 334 | 925 | 0.92 | 7.74 |
| L | 504 | | 13.9 | 600 | 333 | 925 | 0.75 | 6.30 |
| M | 505 | | 13.8 | 600 | 334 | 925 | 1.00 | 8.34 |
| N | 506 | | 13.9 | 600 | 333 | 925 | 0.97 | 8.04 |
| O | 504 | | 13.9 | 600 | 333 | 925 | 0.93 | 7.80 |
| P | 505 | | 13.8 | 600 | 334 | 900 | 1.00 | 8.34 |
| Q | 504 | | 14.0 | 600 | 332 | 925 | 1.00 | 8.34 |
| R | 508 | | 13.8 | 600 | 331 | 925 | 0.97 | 8.04 |
| S | 506 | | 13.8 | 600 | 331 | 925 | 0.97 | 8.10 |
| T | 506 | | 14.0 | 600 | 332 | 925 | 1.00 | 8.28 |
| Totals before correction | 10,205 | 70.3 | 284.6 | | | | 14.78 | |
| Corrected Totals | 10,205 | 70.3 | | | | | 14.78 | |
| Average | 512 | | 14.2 | 600 | 330 | 925 | 0.74 | 4.80 |

| Run 30 | H₂ consumed | HCl consumed | Propane produced | Isobutane produced | Liquid Yield | Octane No. (CFR-M) | Increase in O. N. |
|---|---|---|---|---|---|---|---|
| | Cubic feet | Grams | | Grams | | | |
| A | 0.10 | 8.3 | None | 12.5 | Not determined | 79.9 | 12.4 |
| B | 0.22 | 5.2 | None | 13.2 | do | 82.0 | 14.5 |
| C | 0.21 | 2.2 | None | 18.6 | do | 79.5 | 12.0 |
| D | 0.19 | 2.5 | None | 12.0 | do | 82.1 | 14.6 |
| E | 0.20 | 0.5 | None | 12.5 | do | 79.8 | 12.3 |
| F | 0.42 | 1.2 | None | 11.2 | do | 81.7 | 14.2 |
| G | 0.42 | 2.1 | None | 16.0 | do | 81.8 | 14.3 |
| H | 0.24 | 3.2 | None | 17.4 | do | 81.5 | 14.0 |
| I | 0.43 | 1.3 | None | 15.4 | do | 80.9 | 13.4 |
| J | 0.46 | 1.4 | None | 18.1 | do | 80.9 | 13.4 |
| K | 0.44 | 1.7 | None | 19.6 | do | 80.9 | 13.4 |
| L | 0.37 | 1.6 | None | 14.8 | do | 80.7 | 13.2 |
| M | 0.49 | 0.9 | None | 21.0 | do | 81.7 | 14.2 |
| N | 0.33 | −0.1 | None | 26.0 | do | 82.0 | 14.5 |
| O | 0.39 | −0.5 | None | 17.2 | do | 80.7 | 13.2 |
| P | 0.35 | −0.3 | None | 20.0 | do | 80.8 | 13.3 |
| Q | 0.33 | −0.3 | None | 18.5 | do | 80.9 | 13.4 |
| R | 0.43 | −0.1 | None | 19.6 | do | 81.0 | 13.5 |
| S | 0.40 | 0.2 | None | 16.5 | do | 80.9 | 13.4 |
| T | 0.44 | 0.2 | None | 23.9 | do | 80.6 | 13.1 |
| Totals before correction | 6.86 | 31.2 | None | 344.0 | 96.0% | 81.0 | 13.5 |
| Corrected Totals | 6.86 | 31.2 | 9.0 | 218.6 | 97.7 | 81.0 | 13.5 |
| Average | 0.34 | 1.56 | None | 10.9 | 97.7 | 81.0 | 13.5 | lengthens the period of activity of the catalyst, and this fact is evidenced by the relatively large amount of hydrocarbon material attached to the catalyst in the form of complex when hydrogen is absent.

Runs 27, 28 and 29 are illustrative of results obtainable at lower temperatures and show that good octane number improvement can be achieved at temperatures of approximately 200° F. in reasonable times according to our invention.

In considering runs 15 through 29, an important point not shown in Table IV is that in each case the catalyst complex remaining was still very active. Run 30 was therefore made in an effort to determine the catalyst life under typical conditions. Since no continuous apparatus was available, a number of tests were made using the same charge of catalyst, the length of each test being determined by the time in which the bomb pressure dropped a predetermined amount, since it It will be observed that a total of 10.205 g. of naphtha was given an average octane number improvement of 13.5 units in less than 15 hours using only 70.3 g. of AlCl₃, and that the reaction time required to achieve this result in each test gradually increased from less than 0.1 hour to about 1 hour and remained substantially constant at the latter value for a considerable period. Obviously the catalyst was not exhausted at the end of the run and the run could have been continued, but even if it had been, the catalyst consumption would have been only 0.69% by weight. Another interesting feature was that the consumption of activator was negligible toward the end of the run and the total consumption was very low. In explanation of the corrections made in the totals shown in Table V, the entire 344 g. in the composite isobutane fraction was analyzed by distillation and found to contain about 9 g. of propane, 218.6 g. of isobutane and 116.4 g. of isopentane, the latter being added to the liquid hydrocarbon fraction to determine the total yield. The other corrections made were minor in nature and need not be detailed.

From the above it will be seen that the production of a light liquid hydrocarbon fraction rich in branched-chain paraffins and having an excellent knock rating from light virgin naphtha according to our invention is a commercially practical process due primarily to its low catalyst requirements. Translated into refinery terms run 30 demonstrates that this light naphtha can be converted into 97.7% of an 81 octane number naphtha especially suitable for aviation purposes by our process using not more than 0.71 pound of activator, 70 cubic feet of hydrogen, and 1.6 pounds of catalyst per barrel of naphtha converted.

Figure 3:
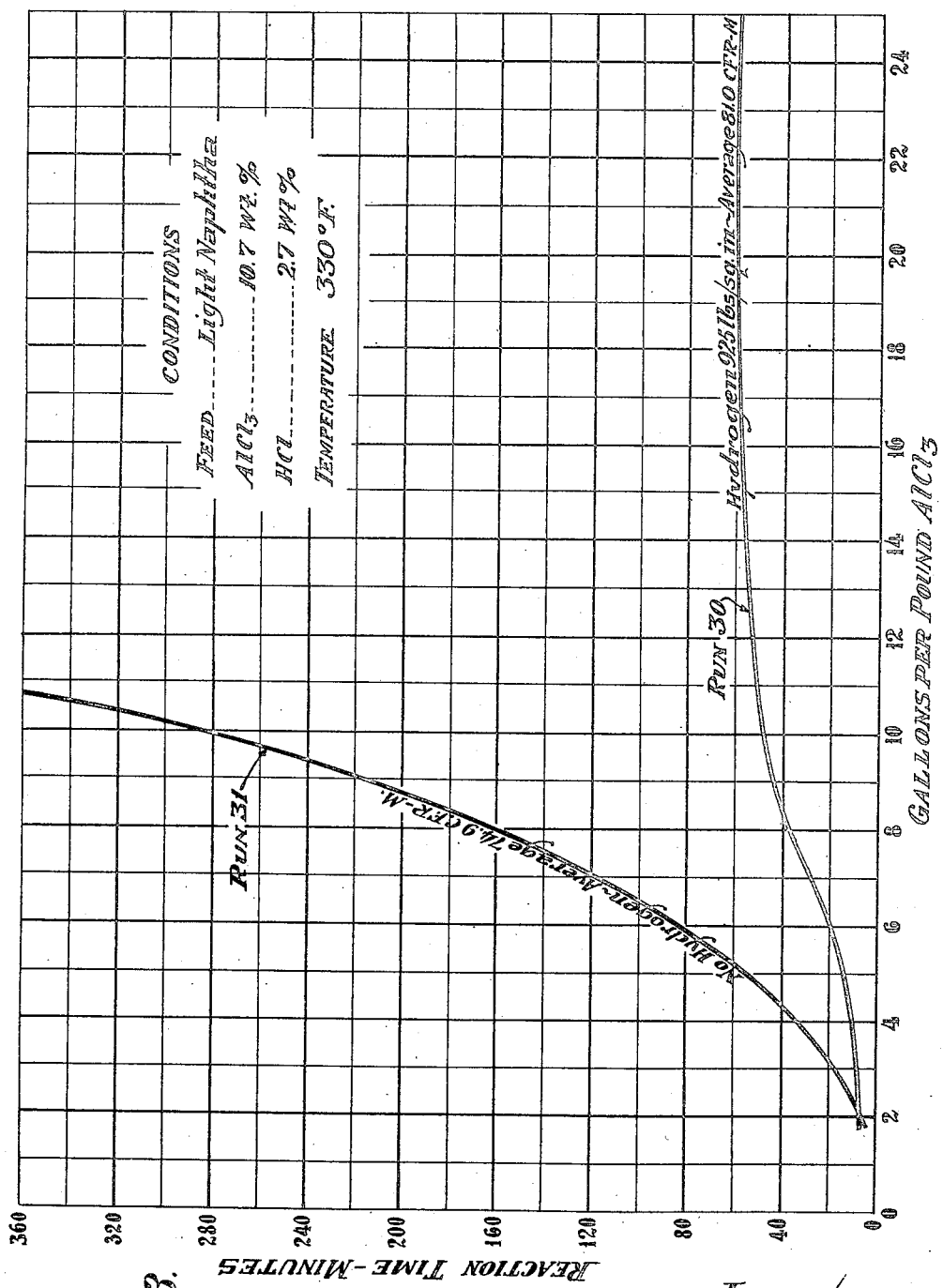
Figure 3 is a graph of the results obtained in comparable runs demonstrating the great advantages derived from operation under hydrogen pressure.

Expressed in another manner, the results of run 30 are shown graphically in Figure 3, which is a plot of the reaction time necessary to effect a certain octane number improvement in each portion of charge (which in this case is substantially proportional to contact factor) against the overall yield in gallons per pound of aluminum chloride up to that point. It is evident that the catalyst activity is extremely well maintained, especially in the later stages of the run. As a matter of fact, no further loss in activity was perceptible up to the time the run was discontinued and the yield was in excess of 26 gallons per pound of aluminum chloride.

In order to demonstrate that no such results are possible without using hydrogen in accordance with our invention, run 31 was made which was exactly like run 30 except that no hydrogen pressure was maintained in the reactor. The detailed results are shown in Table VI.

liquid feed to isobutane and to the formation of inactive complex. Reference to Figure 3 will show this difference in a manner so striking that further observations would appear to be superfluous.

Table V shows that during the conversion of 10,205 grams of light naphtha, 6.86 cubic feet of hydrogen were consumed. In other units this amounts to a consumption of approximately 70 cubic feet of hydrogen per barrel of naphtha charged.

This application is a continuation-in-part of our co-pending application Serial Number 245,570, filed December 14, 1938, now U. S. Patent No. 2,266,012.

Many modifications of our invention and of the apparatus shown herein for carrying out the same will be apparent to those skilled in the art, and they will be able to supply numerous details not illustrated in the drawings, such as heat exchangers, provisions for fractionating tower control, etc. We do not desire to be limited to the specific modifications and examples used in illustrating our invention, but only by the appended claims, wherein we have defined our invention.

We claim:

1. The process of converting a paraffin hydrocarbon within the range of pentane to octane to obtain substantial yields of an isomerization product of higher octane number, which process comprises subjecting said paraffin hydrocarbon to the action of an aluminum halide catalyst effective in causing said conversion in a reaction zone in the presence of a substantial amount of an added hydrogen halide activator, maintaining said zone at a temperature within the approximate range of 100° F. to 550° F. and maintaining said zone under a hydrogen pressure of at least 250 pounds per square inch.

2. The process of claim 1 wherein the contact factor is greater than that defined by the equation $$\log_{10} K_x = \frac{4883}{460+T} - 6.417$$

Table VI

| Run 31 | Light naphtha | AlCl₃ | HCl | Initial H₂ Pressure | Temperature | Pressure | Reaction Time | Contact factor |
|---|---|---|---|---|---|---|---|---|
| | Grams | | | | °F. | | Hours | Minutes |
| A | 654 | 70.4 | 20.0 | None | 300 | 300 | 0.133 | 0.86 |
| B | 505 | | 13.8 | ___do___ | 300 | 300 | 0.15 | 1.25 |
| C | 505 | | 13.9 | ___do___ | 316 | 330 | 0.33 | 2.79 |
| D | 505 | | 13.9 | ___do___ | 330 | 350 | 0.33 | 11.2 |
| E | 505 | | 14.0 | ___do___ | 332 | 380 | 2.50 | 20.9 |
| F | 505 | | 13.9 | ___do___ | 332 | 370 | 2.75 | 23.0 |
| G | 505 | | 14.0 | ___do___ | 330 | 370 | 3.75 | 31.4 |
| H | 505 | | 14.0 | ___do___ | 332 | 360 | 4.42 | 37.0 |
| Total | 4,189 | | 117.5 | None | | | 15.36 | |
| Average | 523.6 | | 14.4 | None | 330 | 345 | 1.92 | 16.05 |

| Run 31 | H₂ consumed | HCl consumed | Propane produced | Isobutane Produced | Liquid Yield | Octane No. (CFR-M) | Increase in O. N. |
|---|---|---|---|---|---|---|---|
| | | Grams | | Grams | | | |
| A | None | 12.4 | None | 35.7 | Not determined | 80.5 | 13.0 |
| B | ___do___ | 1.9 | ___do___ | 11.3 | ___do___ | 73.2 | 5.7 |
| C | ___do___ | 0.0 | ___do___ | 8.2 | ___do___ | 71.9 | 4.4 |
| D | ___do___ | 0.9 | ___do___ | 17.0 | ___do___ | 74.5 | 7.0 |
| E | ___do___ | —0.5 | ___do___ | 27.4 | ___do___ | 77.2 | 9.7 |
| F | ___do___ | —0.2 | ___do___ | 19.6 | ___do___ | 73.9 | 6.4 |
| G | ___do___ | 1.3 | ___do___ | 18.7 | ___do___ | 74.5 | 7.0 |
| H | ___do___ | 1.8 | ___do___ | 13.2 | ___do___ | 73.4 | 5.9 |
| Total | None | 17.1 | None | 151.1 | 94.2 | 74.9 | 7.4 |
| Average | None | 2.1 | None | 18.9 | 94.2 | 74.9 | 7.4 |

The results of run 31 conclusively show that the AlCl₃ catalyst was very rapidly deactivated and so was unable to approach in any reasonable time either the low ultimate catalyst requirement or the high octane number improvement obtained in run 30 under hydrogen pressure. Even the liquid yield was only 94.2% as against 97.7%, the difference being mainly increased loss of where $K_m$ is the contact factor in minutes and T is the reaction temperature in degrees Fahrenheit.

3. The process of claim 1 wherein the temperature of the reaction zone is not higher than about 350° F.

4. The process of claim 1 wherein a charging stock is employed which consists essentially of a naphtha having an end point not substantially higher than about 158° F. and containing substantially no heptane.

5. The process of claim 1 wherein the aluminum halide is aluminum chloride and wherein the hydrogen pressure and other operating conditions are such that less than two parts by weight of aluminum chloride is consumed in the conversion for each hundred parts by weight of hydrocarbon subjected to the action of said catalyst.

6. The process of claim 1 wherein the effective activator is hydrogen chloride and wherein more than two parts by weight of hydrogen chloride is introduced into the reaction zone for each hundred parts by weight of hydrocarbon introduced thereto.

7. In a process for converting normally liquid paraffin hydrocarbons in a substantially saturated naphtha to obtain substantial yields of branched-chain paraffin hydrocarbons of higher octane number by treatment with an aluminum halide catalyst effective for causing said conversion and an activator for affording an excess of hydrogen halide in a conversion zone at a temperature within the approximate range of 200 to 350° F., the method of prolonging catalyst life and increasing the amount of said conversion effected by a given amount of catalyst which method comprises effecting said conversion under a pressure within the approximate range of 500 to 1500 pounds per square inch in the presence of a sufficient amount of free hydrogen to effect a hydrogen consumption in the conversion zone and to maintain the catalyst in active condition for a much longer period of time than it would be maintained in the absence of said hydrogen.

8. The method of claim 7 wherein less than one part by weight of fresh aluminum halide and more than two parts by weight of the activator are introduced into the conversion zone for each hundred parts by weight of naphtha introduced thereto.

9. The process of converting a substantial portion of normally liquid paraffin hydrocarbons in a substantially saturated naphtha into branched-chain paraffin hydrocarbons of higher octane number, which process comprises effecting the formation of a complex by the reaction of aluminum chloride with a minor portion of said naphtha in the presence of hydrogen chloride and contacting a major portion of said naphtha with said complex and hydrogen chloride in a reaction zone at a temperature within the approximate range of 100 to 550° F. and under a hydrogen pressure of at least 250 pounds per square inch.

10. The process as defined by claim 9 which includes the further steps of continuously adding naphtha to the reaction zone and continuously withdrawing conversion products therefrom, continuously introducing into said reaction zone less than two parts of fresh aluminum chloride for each hundred parts by weight of naphtha introduced thereto and continuously introducing into said reaction zone more than two parts by weight of hydrogen chloride for each hundred parts by weight of naphtha which is introduced thereto.

11. The process of converting a substantial portion of normally liquid paraffin hydrocarbons in a substantially saturated naphtha charging stock into branched-chain paraffin hydrocarbons of higher octane number, which process comprises effecting the pre-formation of a complex by the reaction of aluminum chloride in the presence of hydrogen chloride with a normally liquid paraffinic hydrocarbon which is substantially free from aromatics and which is substantially different in composition from the saturated naphtha charging stock, and contacting said saturated naphtha charging stock with said pre-formed catalyst complex in the presence of added hydrogen chloride in a reaction zone at a temperature within the approximate range of 100 to 550° F. under a hydrogen pressure of at least 250 pounds per square inch.

12. The process for increasing the octane number of a substantially saturated light naphtha rich in paraffin hydrocarbons and characterized by a low octane number which process comprises introducing said naphtha into a reaction zone, introducing into said zone make-up aluminum chloride in amounts less than two percent by weight based on naphtha charged and introducing hydrogen chloride in amounts more than two percent by weight based on naphtha charged, maintaining said reaction zone at a temperature within the approximate range of 100 to 350° F., maintaining a hydrogen pressure in said reaction zone of at least 250 pounds per square inch and employing a contact factor in the reaction greater than that defined by the equation $$\mathrm{Log}_{10} K_m = \frac{4883}{460+T} - 6.417$$

where $K_m$ is the contact factor in minutes and T is the temperature in degrees Fahrenheit.

13. The method of converting a substantially saturated light paraffinic naphtha having a CFR–M octane number below 70 in order to obtain at least about a 97 volume percent yield of a gasoline fraction having a CFR–M octane number above about 80 and only a small amount of isobutane, which method comprises introducing said naphtha with an aluminum chloride catalyst and hydrogen chloride into a reaction zone, maintaining the temperature of the reaction zone within the approximate range of 200 to 350° F., continuously maintaining a hydrogen pressure in said reaction zone of at least 250 pounds per square inch, continuously introducing not more than about one percent by weight of make-up aluminum chloride based on naphtha charged, continuously introducing at least about three percent by weight of hydrogen chloride based on naphtha charged, and fractionating the resulting products.

14. In the process of isomerizing a relatively low knock rating paraffinic hydrocarbon in the pentane to octane boiling range for obtaining substantial yields of a normally liquid isomerization product of materially higher knock rating by contacting said hydrocarbon with an aluminum halide catalyst effective in causing said isomerization in the presence of a substantial amount of an added hydrogen halide activator in a reaction zone maintained at isomerization temperature and at a substantial superatmospheric pressure for a period of time and with an amount of catalyst for effecting substantial isomerization, the improvement which comprises adding hydrogen to said zone in such quantity as to maintain free hydrogen therein and in such quantity and under such pressure as to maintain the catalyst in active condition for a much longer period of time than it would be maintained in said condition in the absence of said added hydrogen.

15. The process of claim 14 which includes the step of effecting the isomerization under such conditions and with such amounts of added hydrogen that a substantial amount of hydrogen is consumed in the reaction zone.

16. The process of converting a paraffinic light naphtha consisting essentially of $C_5$ and $C_6$ hydrocarbons to obtain substantial yields of a higher octane number isomerization product, which process comprises treating said naphtha with an aluminum chloride catalyst in a reaction zone in the presence of substantial amounts of added hydrogen chloride at a temperature within the approximate range of 100 to 550° F. and at a pressure within the approximate range of 500 to 1500 pounds per square inch, and adding hydrogen to said zone in such quantity as to maintain free hydrogen therein and in such quantity and under such pressure as to maintain the catalyst in active condition for a much longer period of time than it would be maintained in said condition in the absence of said added hydrogen.

17. The process of converting a substantial portion of the normally liquid paraffin hydrocarbons in a substantially saturated naphtha into branched-chain paraffin hydrocarbons of higher octane number which process comprises subjecting said naphtha to the action of an aluminum halide catalyst effective in causing said conversion and an activator affording a hydrogen halide under a hydrogen pressure of at least 250 pounds per square inch in two separate reaction zones, the first of said zones being maintained at a temperature within the approximate range of 300 to 550° F. and the second of said zones being maintained at a low temperature within the approximate range of 100 to 300° F., separating the products from each of said reaction zones into a catalyst-containing portion and a hydrocarbon fraction, and introducing at least a part of the catalyst-containing portion from the second reaction zone into said first reaction zone.

18. The process of converting a substantial portion of the normally liquid paraffin hydrocarbons in a substantially saturated naphtha into branched-chain paraffin hydrocarbons of higher octane number which process comprises subjecting said naphtha to the action of an aluminum halide catalyst effective in causing said conversion and an activator affording a hydrogen halide in a first reaction zone at a temperature within the approximate range of 300 to 550° F. under a hydrogen pressure of at least 250 pounds per square inch, removing the products from said first reaction zone, separating said products into a catalyst fraction and a hydrocarbon fraction, introducing said hydrocarbon fraction into a second reaction zone for reaction with further quantities of said catalyst and said activator in the presence of free hydrogen at a lower temperature within the approximate range of 100 to 300° F., removing the products from said second reaction zone and recovering a fraction containing branched-chain hydrocarbons from said last mentioned products.

19. The process of isomerizing low molecular weight normally liquid paraffinic hydrocarbons which process comprises subjecting said low molecular weight normally liquid paraffinic hydrocarbons to the action of an aluminum chloride catalyst effective for causing said isomerization in the presence of a substantial amount of a halogen halide activator in a reaction zone maintained at a temperature within the approximate range of 100 to 550° F., under a hydrogen pressure of at least 250 pounds per square inch, removing reaction products and a portion of said catalyst from the top of said reaction zone, separating the removed catalyst and returning at least a portion of the removed catalyst to the reaction zone.

20. The process of claim 19 which includes the further step of cooling the removed reaction products before catalyst material is separated therefrom.

21. The process of isomerizing low molecular weight normally liquid paraffinic hydrocarbons which process comprises subjecting said low molecular weight normally liquid paraffinic hydrocarbons to the action of an aluminum chloride catalyst effective for causing said isomerization in the presence of a substantial amount of a halogen halide activator in a reaction zone maintained at a temperature within the approximate range of 100 to 550° F., under a hydrogen pressure of at least 250 pounds per square inch, removing reaction products together with a gas containing hydrogen chloride from the top of said reaction zone, separating the hydrogen chloride from the withdrawn products and returning at least a part of the separated hydrogen chloride to the reaction zone.

22. The process of isomerizing low molecular weight normally liquid paraffinic hydrocarbons which process comprises subjecting said low molecular weight normally liquid paraffinic hydrocarbons to the action of an aluminum chloride catalyst effective for causing said isomerization in the presence of a substantial amount of a halogen halide activator in a reaction zone maintained at a temperature within the approximate range of 100 to 550° F., under a hydrogen pressure of at least 250 pounds per square inch, removing reaction products together with a gas containing hydrogen from the top of said reaction zone, separating hydrogen from the removed products and returning at least a portion of the separated hydrogen to said reaction zone.

23. The process of converting a paraffin hydrocarbon containing at least six carbon atoms to obtain substantial yields of an isomerization product of higher octane number, which process comprises subjecting said paraffin hydrocarbon to the action of an aluminum halide catalyst effective in causing said conversion in a reaction zone in the presence of a substantial amount of an added hydrogen halide activator, maintaining said zone at a temperature within the approximate range of 122° F. to 400° F. and maintaining said zone under a hydrogen pressure of at least 250 pounds per square inch.

24. The process of converting normally liquid paraffin hydrocarbon material boiling within the gasoline boiling point range to obtain normally liquid isomerization products of higher octane number which process comprises subjecting said paraffin hydrocarbon to the action of an aluminum chloride catalyst effective in causing said conversion in a reaction zone in the presence of added hydrogen chloride as an activator for said aluminum chloride, maintaining said zone within the approximate range of 122° F. to 400° F. and maintaining said zone under a hydrogen pressure of at least 250 pounds per square inch.

25. The process for the conversion of normally liquid paraffin hydrocarbon material boiling within the gasoline boiling point range to obtain normally liquid isomerization products of higher octane number which process comprises passing said paraffin hydrocarbon continuously through a reaction zone, contacting it therein with an aluminum chloride catalyst effective in causing said conversion, maintaining in said reaction zone a temperature in the approximate range of 200° to 400° F. and a superatmospheric pressure, and continuously passing into said reaction zone to contact with said paraffin material therein, hydrogen chloride as an activator for said catalyst and free hydrogen under super-atmospheric pressure, thereby maintaining said catalyst in active condition.

EDMOND L. D'OUVILLE.
BERNARD L. EVERING.

REFERENCES CITED

The following references are of record in the file of this patent:

UNITED STATES PATENTS

| Number | Name | Date |
|---|---|---|
| 1,608,328 | McAfee | Nov. 23, 1926 |
| 1,825,270 | Jenkins et al. | Sept. 29, 1931 |
| 1,825,294 | Wolcott | Sept. 29, 1931 |
| 1,835,748 | Behimer | Dec. 8, 1931 |
| 2,169,494 | Ipatieff et al. | Aug. 15, 1939 |
| 2,172,146 | Ruthruff | Sept. 5, 1939 |
| 2,220,092 | Evering et al. | Nov. 5, 1940 |
| 2,266,012 | d'Ouville et al. | Dec. 16, 1941 |

FOREIGN PATENTS

| Number | Country | Date |
|---|---|---|
| 24,044 | India | Aug. 23, 1937 |
| 842,204 | France | Feb. 27, 1939 |
| 823,595 | France | Jan. 22, 1938 |

OTHER REFERENCES

Moldavskii et al.: Jour. Gen. Chem. (USSR), vol. 5, Ser. A. 1791–97 (1935) Trans. in 260–676 (11 pages).

Petrov et al.: Oil and Gas Jour., Feb. 2, 1939, pages 42 and 45.

Glasebrook et al.: Jour. Am. Chem. Soc., vol. 58, 1944–8 (1936).

Ipatieff et al.: Jour. Ind. and Eng. Chem., vol. 28, 461–4 (1936).